US006922939B2

(12) United States Patent
Moorhouse

(10) Patent No.: US 6,922,939 B2
(45) Date of Patent: Aug. 2, 2005

(54) FISHING LURE

(76) Inventor: John Richard Moorhouse, Footrill Cottage Skiers Spring, Hoyland, Barnsley S64 9BX (GB)

( * ) Notice: Subject to any disclaimer, the term of this patent is extended or adjusted under 35 U.S.C. 154(b) by 0 days.

(21) Appl. No.: 10/627,077

(22) Filed: Jul. 25, 2003

(65) Prior Publication Data

US 2004/0025407 A1 Feb. 12, 2004

(30) Foreign Application Priority Data

Jul. 26, 2002 (GB) ............................................ 0217357

(51) Int. Cl.⁷ .............................................. A01K 85/02
(52) U.S. Cl. ...................... 43/42.35; 43/42.39; 43/42.24
(58) Field of Search ............................. 43/42.39, 42.53, 43/43.12, 44.81, 44.9, 44.91, 44.92, 44.93, 42.36, 42.08, 42.24, 42.35

(56) References Cited

U.S. PATENT DOCUMENTS

| 2,939,241 | A | * | 6/1960 | Hicks | ............................ | 43/41 |
| 3,680,247 | A | * | 8/1972 | McKenzie | .................. | 43/42.17 |
| 3,861,075 | A | | 1/1975 | Ingram | | |
| 4,139,963 | A | | 2/1979 | Ingram | | |
| 4,914,851 | A | | 4/1990 | Acker | | |
| 5,228,230 | A | * | 7/1993 | Vaught | ...................... | 43/42.26 |
| 5,787,633 | A | * | 8/1998 | Taylor | ....................... | 43/42.02 |
| 5,829,183 | A | * | 11/1998 | Guerin | ....................... | 43/42.35 |
| 6,105,303 | A | * | 8/2000 | Hall, Sr. | .................... | 43/42.04 |
| 6,182,390 | B1 | * | 2/2001 | Watkins | ...................... | 43/42.31 |
| 6,266,916 | B1 | | 7/2001 | Dugan | | |
| 6,546,663 | B1 | * | 4/2003 | Signitzer et al. | ............... | 43/4.5 |
| 6,658,785 | B1 | * | 12/2003 | Faulkner et al. | ............. | 43/44.2 |
| 6,675,526 | B1 | * | 1/2004 | Baron | ....................... | 43/42.36 |

FOREIGN PATENT DOCUMENTS

| GB | 2029181 | 3/1980 |
| GB | 0217357 | 10/1986 |
| GB | 2299738 | 10/1996 |

OTHER PUBLICATIONS

Swifty's of Vauxhall website: Dec. 23, 2001; web.archive.org/web/20011223052243/www.angling.uk.net/hostv4/swiftys/swiftys_lures_41.html.*
Search Report for GB Application No. 0217357.3.

* cited by examiner

Primary Examiner—Peter M. Poon
Assistant Examiner—Timothy D. Collins
(74) Attorney, Agent, or Firm—Harness, Dickey & Pierce, P.L.C.

(57) ABSTRACT

A fishing lure having a head portion, a body portion and a tail portion, the fishing lure defining an internal chamber having a first opening in the head portion and a second opening in the body portion; the first opening configured to allow fishing line to be inserted therethrough into the internal chamber, and the second opening configured to allow a fishing weight to be inserted therethrough into the internal chamber. A method of assembling such a fishing lure, and a fishing weight and hook, onto a fishing line; the method comprising the steps of: assembling the fishing lure onto the fishing line by threading fishing line through the first opening and the second opening of the fishing lure; assembling the fishing weight onto the fishing line; and assembling the hook onto the fishing line.

15 Claims, 12 Drawing Sheets

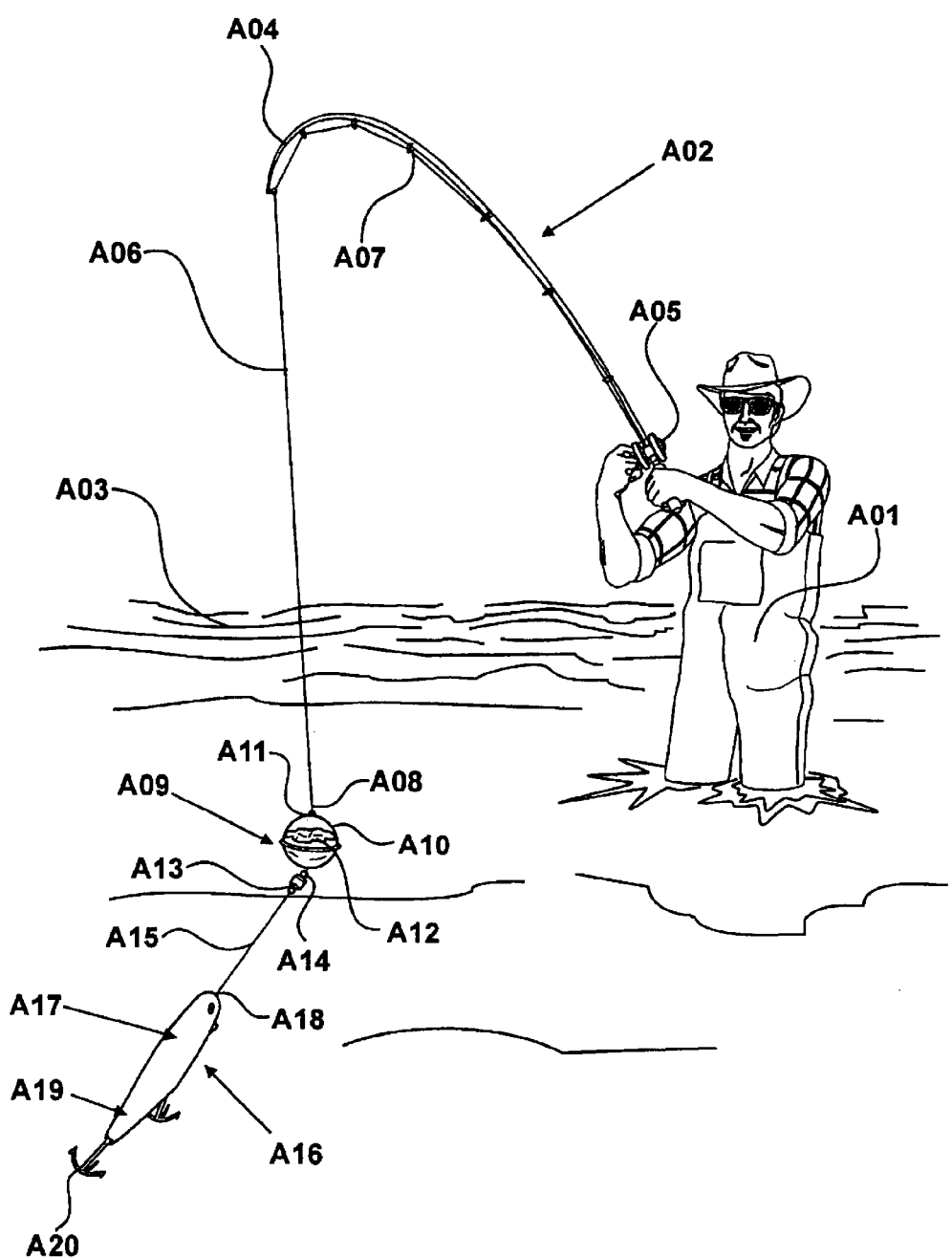
Figure A

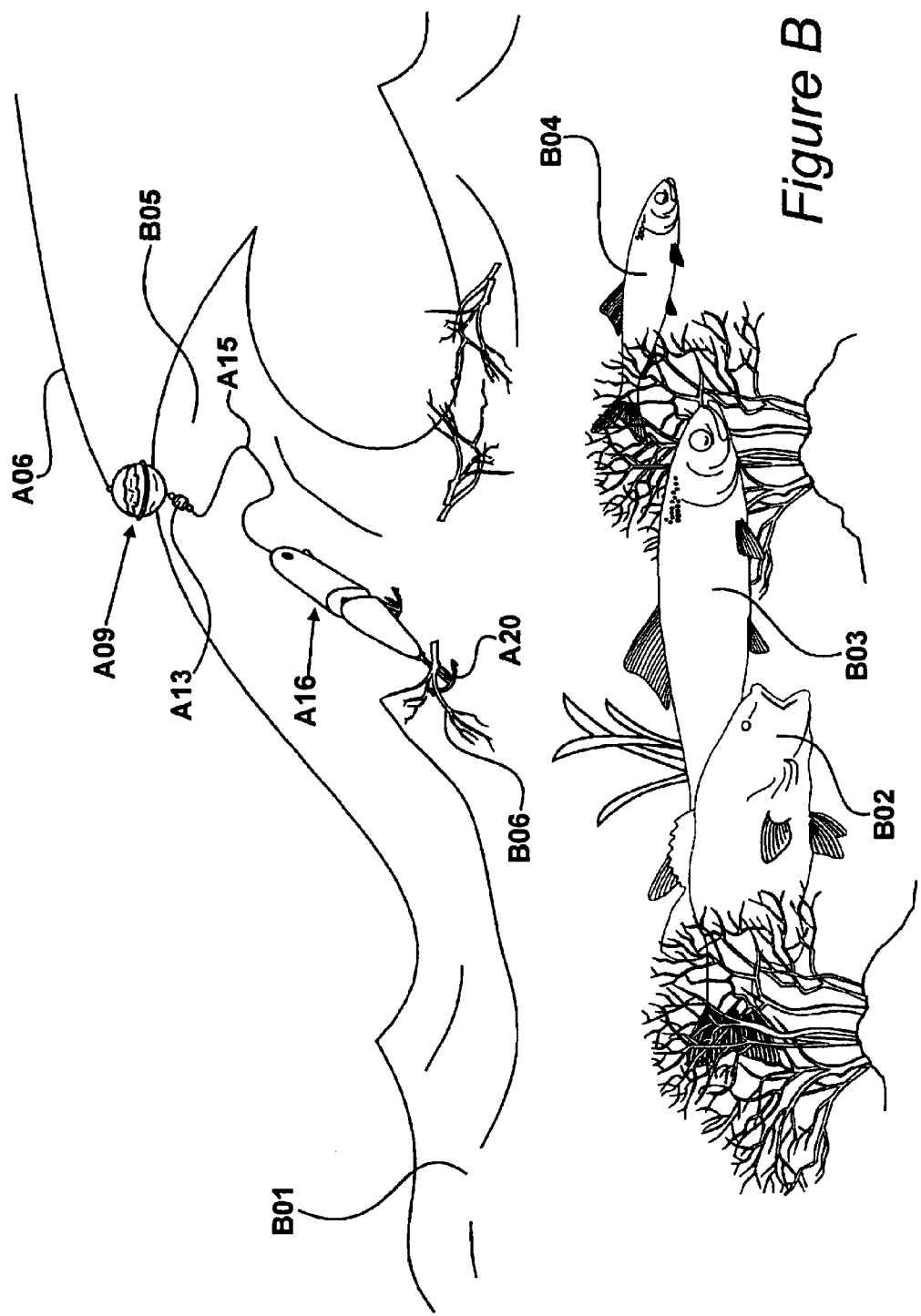

FISHING LURE

CROSS-REFERENCE TO RELATED APPLICATION

This application claims priority to United Kingdom Patent Application No. 02 17 357.3, filed Jul. 26, 2002, the entire disclosure of which is incorporated herein by reference in its entirety as if fully set forth herein.

FIELD

The present invention relates generally to fishing lures, and more particularly to a fishing lure and method of assembling a fishing lure, weight and hook onto a fishing line.

BACKGROUND

Fishing lures function to attract fish towards a hook upon which a fish may be caught. Available types of fishing lures differ in size, shape, material, colour, smell and buoyancy; and additional features of some fishing lures include mechanisms to produce noise or vibrations, or to release a liquid attractant.

When selecting a fishing lure for use, an angler may consider a number of variables, for example, the water environment in which a fishing lure is to be used, the type of fish which is sought to be caught, the type of fishing system within which the fishing lure will be used, and the ease of use of a fishing lure. In addition, a fisherman may take into account his own or other peoples perceptions of what is attractive to a fish. For example, an angler may consider a style of motion of a fishing lure whilst in the water, to be particularly attractive to one or more types of fish.

FIG. A shows an angler A01 using a prior art fishing system A02 in coastal water A03. Assembled to fishing rod A04 is a spinning reel A05, around which a fishing line A06 is wound. Fishing line A06 extends from spinning reel A05 along the length of fishing rod A04, along which are spaced a plurality of supporting hooks A07 upon which fishing line A06 rests. Fishing line A06 extends beyond fishing rod A04, and the free end A08 of fishing line A06 is secured to a bubble float A09. Bubble float A09 comprises two hemispheres A10, each having a connecting hook A11, that releasably connect to each other. Bubble float A09 is configured to be separated into the two hemispheres A10 so that water A12 can be placed inside one of the hemispheres A10. Thus, when the hemispheres A10 are connected together again, bubble float A09 contains water A12.

As shown in FIG. A, free end A08 of fishing line A06 is secured to a first connecting hook A11 of bubble float A09. Prior art fishing system A02 also comprises a swivel stop A13, which has two connecting hooks A14; a first of which is secured to the second connecting hook A11 of bubble float A09. Lead line A15 is secured to and extends from the second connecting hook A14 of swivel stop A13 to a prior art fishing lure A16. Swivel stop A13 functions to prevent lead line A15 from twisting. Prior art fishing lure A16 comprises a front portion A17, to which lead line A15 is connected at connection point A18, and a rear portion A19; each portion having a barbed hook A20 extending therefrom.

FIG. B shows an underwater view of prior art fishing system A02 in use in tidal water B01. The function of prior art fishing lure A16 is to attract fish, such as fish B02, B03 and B04, by resembling a fish upon which fish, such as fish B02, B03 and B04, feed in nature. Prior art fishing lure A16 is configured such that a fish, such as fish B03, will attempt to feed upon prior art fishing lure A16 and consequently will become caught on a barbed hook A20.

Angler A01 is using prior art fishing system A02 according to a known method, wherein angler A01 casts out prior art fishing lure A16 into water B01, and then reels in prior art fishing lure A16 by means of winding fishing line A06 upon spinning reel A05. Thus, angler A01 effectively drags prior art fishing lure A16 through tidal water B01, in order to fool fish B02, B03 and B04, which have a predatory nature, into thinking that prior art fishing lure A16 is a real, swimming fish upon which they may feed.

Bubble float A09 acts as a weight on the end of fishing line A06, to facilitate casting out of prior art fishing lure A16. However, bubble float A09 also acts a float, and it can be seen from FIG. B that bubble float A09 is floating upon the crest of wave B05. A disadvantage of this feature is that, due to the fixed length of lead line A15, as bubble float A09 rises and falls due to the motion of tidal water B01, the maximum depth of prior art fishing lure A16 below bubble float A09 correspondingly rises and falls. Thus, as shown in FIG. B, the action of wave B05 has resulted in prior art fishing lure A16 being pulled away from, and possibly out of visible range of, fish B02, B03 and B04. According to the speed and the action of wave B05, this may occur rapidly, and as a result, prior art fishing lure A16 may move in an unnatural style which will discourage fish B02, B03 and B04 from attempting to feed upon prior art fishing lure A16.

A further disadvantage arising from the configuration of prior art fishing system A02, is that the action of angler A01 reeling in fishing line A06 effectively exerts a pulling force on bubble float A09 and not directly upon prior art fishing lure A16. Thus, the degree of control angler A01 can exert over prior art fishing lure A16, is reduced by the termination of fishing line A06 at the first connecting hook A11 of bubble float A09. During use of prior art fishing system A02, lead line A15 is able to become slack, and consequently, prior art fishing lure A16 is free to move in any direction according to the motion of tidal water B01. Thus, prior art fishing lure A16 may have periods of erratic movement, which may discourage fish B02, B03 and B04 from attempting to feed upon prior art fishing lure A16.

Periods of unnatural erratic movement of prior art fishing lure A16 may also result from a feature of prior art fishing system A02, wherein lead line A15 is connected to prior art fishing lure A16 at a single connection point A18 on the front portion A17. Thus, even in circumstances under which lead line A15 is in the fully taut position (as shown in FIG. A), forces acting on prior art fishing lure A16 may influence it to move randomly in any direction about connection point A18.

As shown in FIG. B, within tidal water B01 are pieces of seaweed, floating naturally at a higher level than B02, B03 and B04, and seaweed B06 has become caught upon a barbed hook A20 of prior art fishing lure A16. The presence of caught seaweed B06 may have an adverse effect on the motion of prior art fishing lure A16 as it is dragged through tidal water B01, and may alert fish B02, B03 and B04 to the fact that prior art fishing lure A16 is not a real fish. In addition, prior art fishing lure A16 or bubble float A09 may become entangled with seaweed, or flotsam and jetsam, to the extent that angler A01,is forced to sever fishing line A06, in order to release it from bubble float A09. This action results in the loss of bubble float A09, swivel stop A13, lead line A15, prior art fishing lure A16, and a length of fishing line A06; causing expense and inconvenience to angler A01.

SUMMARY

According to a first aspect of the invention, there is provided a fishing lure having a head portion, a body portion and a tail portion, said fishing lure defining an internal chamber having a first opening in said head portion and a second opening in said body portion; wherein said first opening is configured to allow fishing line to be inserted therethrough into said internal chamber, and said second opening is configured to allow a fishing weight to be inserted therethrough into said internal chamber.

According to a second aspect of the invention, there is provided components configured to be assembled into a fishing lure assembly, said components comprising a fishing lure having a head portion, a body portion and a tail portion, said fishing lure defining an internal chamber having a first opening in said head portion and a second opening in said body portion; said first opening configured to allow fishing line to be inserted therethrough into said internal chamber, and said second opening configured to allow a fishing weight to be inserted therethrough into said internal chamber, a fishing weight, and a hook.

According to a third aspect of the invention, there is provided a method of assembling a fishing lure, fishing weight and hook onto a fishing line; said fishing lure having a head portion, a body portion and a tail portion, said fishing lure defining an internal chamber having a first opening in said head portion and a second opening in said body portion; said first opening configured to allow fishing line to be inserted therethrough into said internal chamber, and said second opening configured to allow a fishing weight to be inserted therethrough into said internal chamber; said method comprising the steps of: assembling said fishing lure onto said fishing line by threading fishing line through said first opening and said second opening of said fishing lure; assembling said fishing weight onto said fishing line; and assembling said hook onto said fishing line.

BRIEF DESCRIPTION OF THE DRAWINGS

FIG. A shows an angler using a prior art fishing system.

FIG. B is an underwater view of the prior art fishing system shown in FIG. 1, in use.

DETAILED DESCRIPTION OF THE EXEMPLARY EMBODIMENTS

Figure 1:
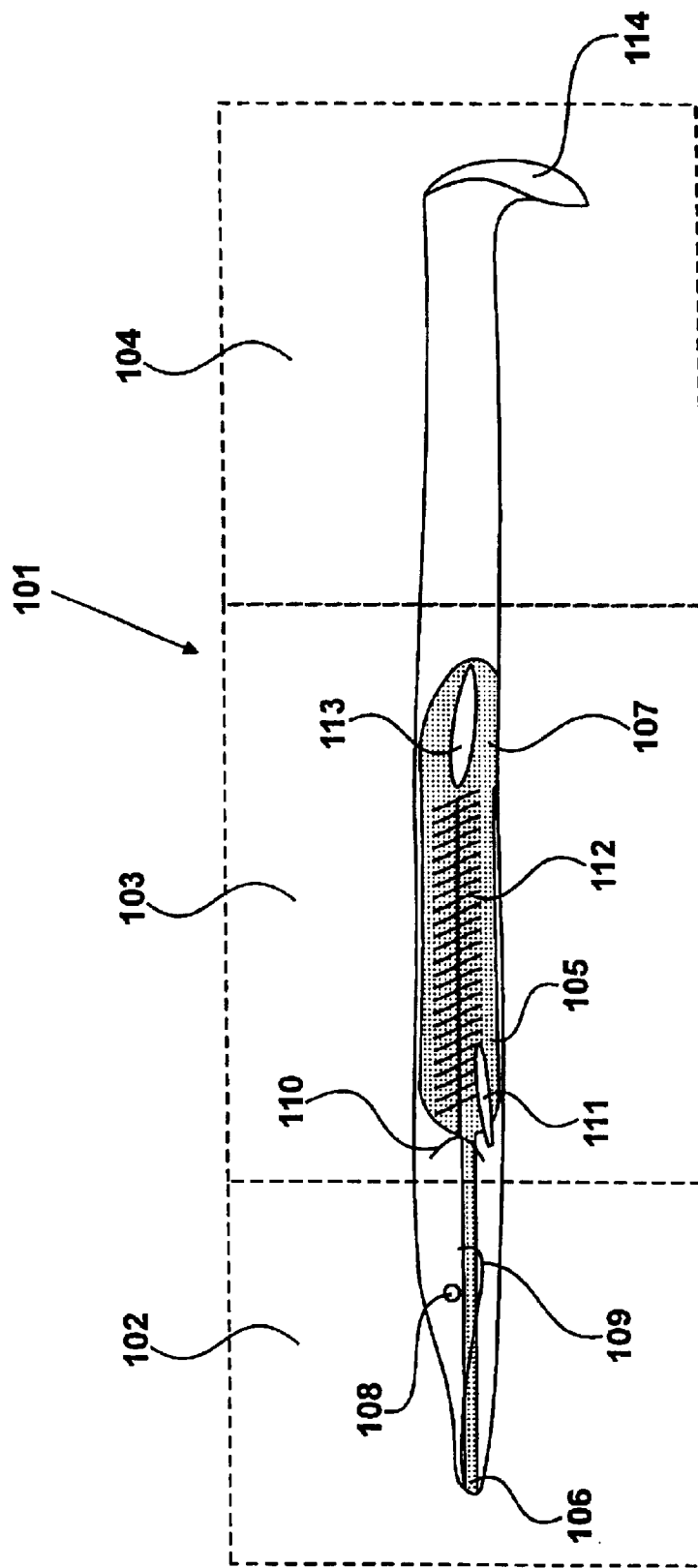
FIG. 1 is a side view of a fishing lure.

FIG. 1 shows a fishing lure 101. Fishing lure 101 has a head portion 102, a body portion 103, and a tail portion 104. Within fishing lure 101 is an internal chamber 105, having a first opening 106 and a second opening 107. First opening 106 is located within head portion 102 of fishing lure 101 and is configured to receive a fishing line. Second opening 107 is located within body portion 103 of fishing lure 101 and is configured to receive a fishing weight. According to the example shown in FIG. 1, first opening 106 is a substantially circular aperture and second opening 107 is a substantially rectangular aperture, with a longitudinal major axis. Fishing lure 101 is a facsimile of a sand eel, and has equivalent features of such a fish, including eyes 108, mouth 109, gills 110, front fins 111, scales 112 and rear fins 113. In addition, fishing lure 101 has a flexible tail fin 114, configured as a baffle plate. In the shown example, first opening 106 forms part of the mouth 109 of fishing lure 101.

Figure 2:
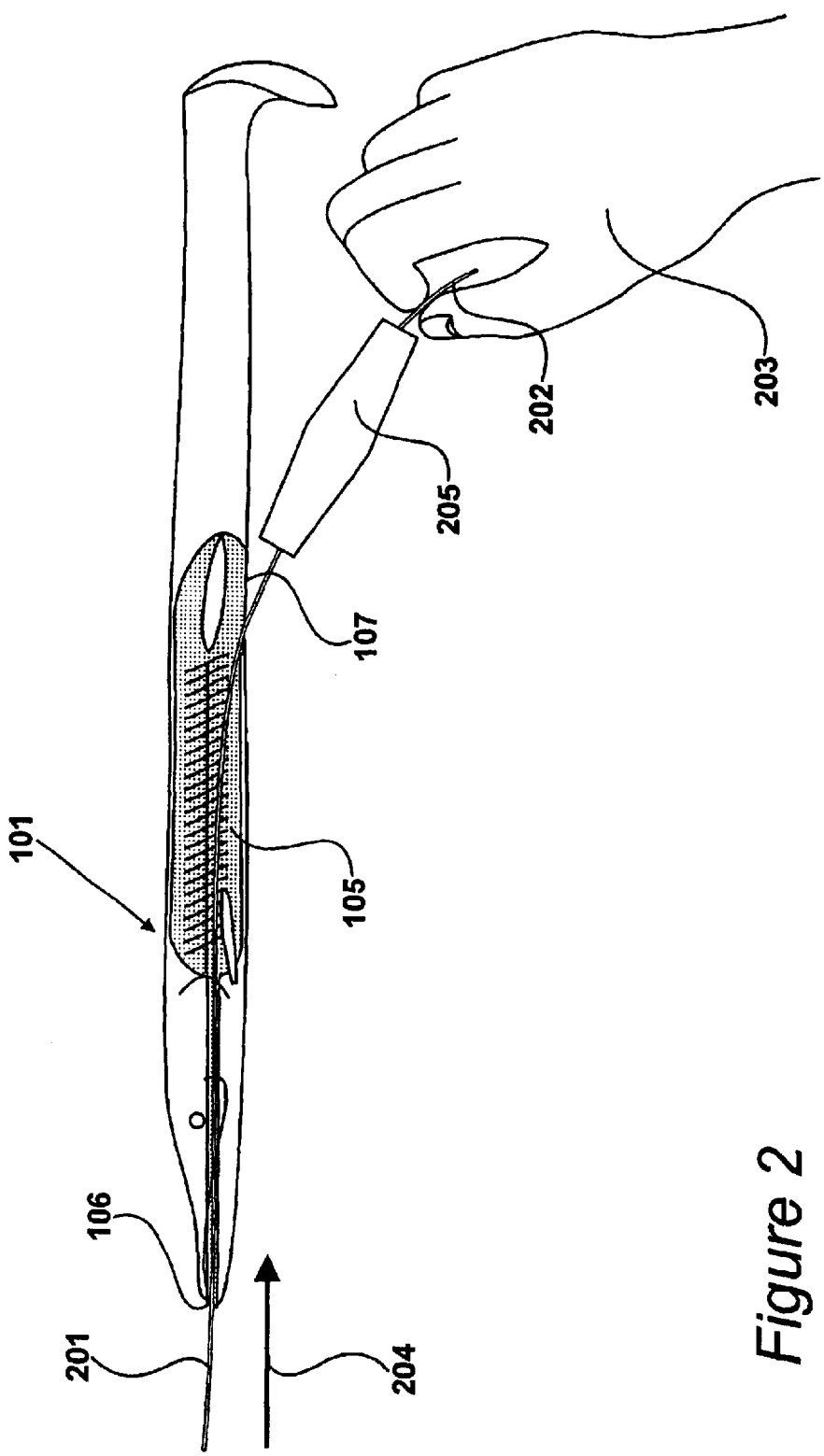
FIG. 2 shows the fishing lure shown in FIG. 1 and a weight, both assembled onto the same fishing line.

Illustrated in FIG. 2, is a method by which fishing lure 101 is assembled onto a fishing line 201. Free end 202 of fishing line 201, shown held by hand 203, is passed in the direction of arrow 204 to the front of fishing lure 101, through first opening 106 into internal chamber 105, and from internal chamber 105 through second opening 107 out underneath fishing lure 101. In this way, fishing lure 101 is threaded upon fishing line, with first opening 106 of internal chamber 105 up-line along fishing line 201 from second opening 107. In this example, the head portion 102 of fishing lure 101 faces up-line.

FIG. 2 also shows a fishing weight, in this example fishing weight 205, suitable for insertion into internal chamber 105 of fishing lure 101. Fishing weight 205, shown assembled onto fishing line 201 down-line from fishing lure 101, is described in further detail below with reference to FIGS. 3A and 3B.

Figure 3A:
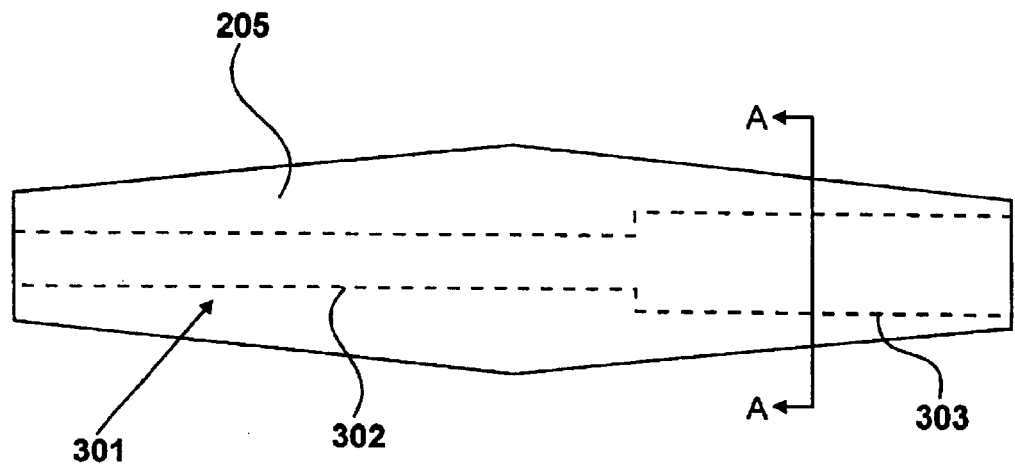
FIG. 3A shows a side view of the weight shown in FIG. 2.

FIG. 3A shows an enlarged view of fishing weight 205, which is a type known as a torpedo fishing weight. Fishing weight 205 defines a passageway 301 extending therethrough, the passageway 301 having a front portion 302, which is radial about the central longitudinal axis of fishing weight 205, and a rear portion 303, the cross-sectional shape of which is shown in more detail in FIG. 3B.

The cross-sectional shape of rear portion 303 is symmetrical about each of perpendicular major and minor axes, with the distance between negative and positive points on the major axis being greater than the distance between negative and positive points on the minor axis; the cross-section having a curved inside surface, and the axis intersection points being points on the inside surface at the greatest distance from the origin of the axes and the negative and positive points approximately forty-five degrees from each axis being points on the inside surface at the least distance from the origin of the axes. In cross-section, the inside surface of passageway 301 forms a concave curve between each axis intersection point and a point approximately forty-five degrees between the axes, in the region of which the inside surface forms a convex curve.

Figure 3B:
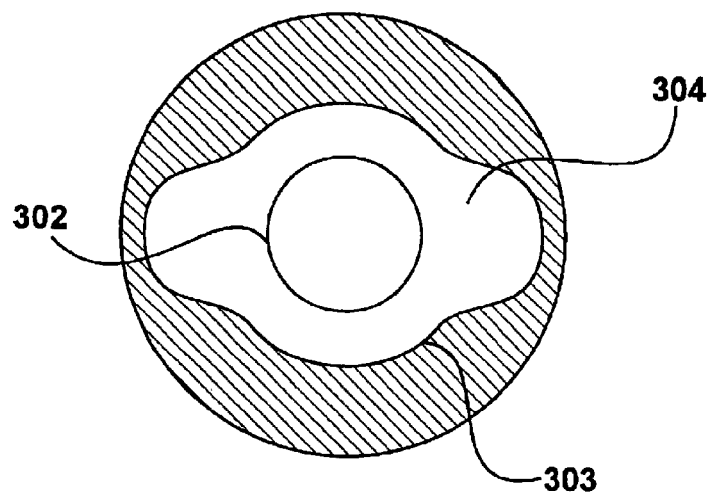
FIG. 3B is a section on line A—A shown in FIG. 3A.

As shown in FIG. 3B, front portion 302 of passageway 301 is smaller in cross-sectional area than the cross-sectional area of rear portion 303, the arrangement such that within fishing weight 205, there is a face 304, perpendicular to the central longitudinal axis of fishing weight 205, at the point along passageway 301 where front portion 302 opens out into rear portion 303.

Figure 4:
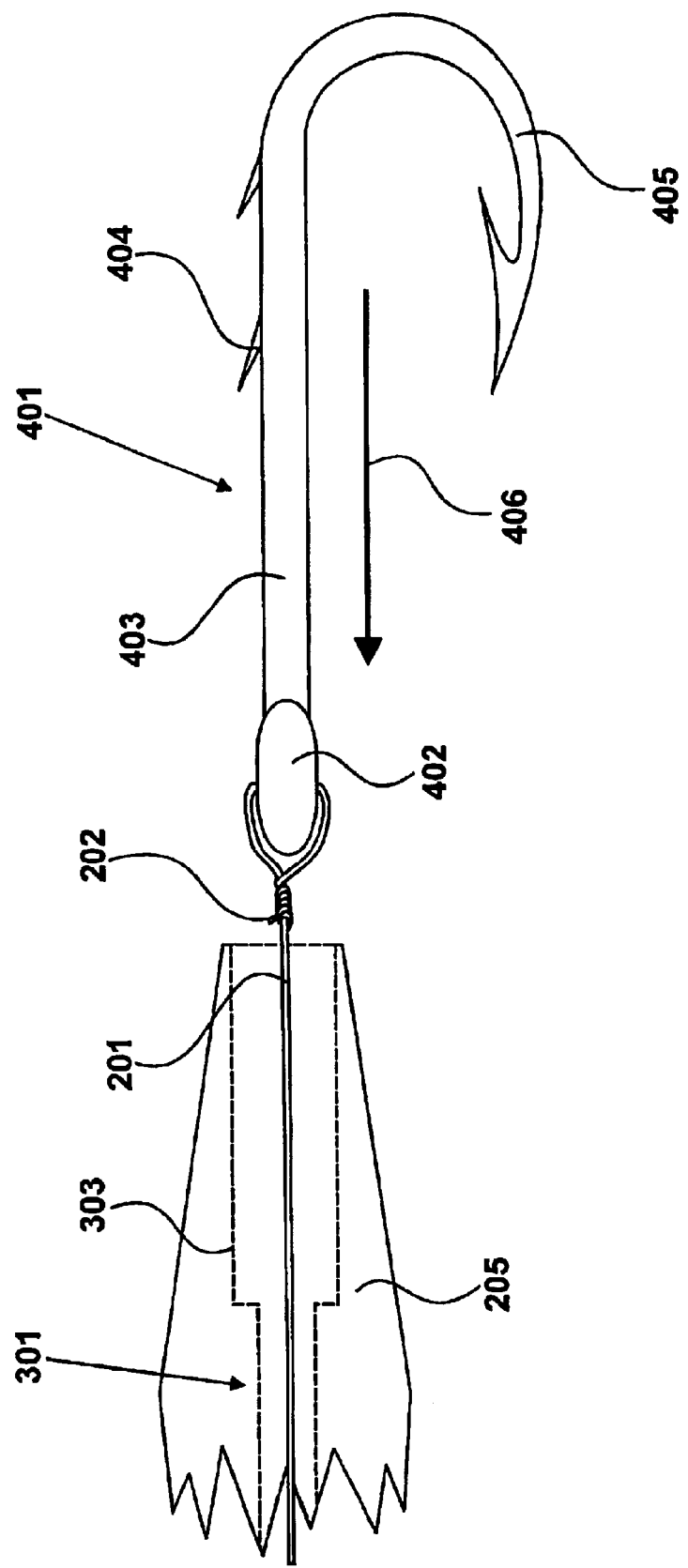
FIG. 4 shows a hook assembled onto the fishing line shown in FIG. 2.

FIG. 4 shows a fishing hook 401 assembled onto fishing line 201, down-line from fishing weight 205, which is oriented such that rear portion 303 of passageway 301 is down-line from front portion 302. Fishing hook 401 has a connecting eye 402 (shown from the side) around which free end 202 of fishing line 201 is tied, a shank 403, two barbs 404, and a barbed crook 405. Rear portion 303 of passageway 301 is configured such that connecting eye 402 of fishing hook 401 will slot into fishing weight 205, in the direction of arrow 406. The cross-sectional shape of rear portion 303 of passageway 301 is configured such that connecting eye 402 of fishing hook 401 will fit into the previously described major axis section of rear portion 303. This feature functions to prevent fishing hook 401 rotating within fishing weight 205.

In the fully inserted position, connecting eye 402 abuts against the passageway face. The length of rear portion 303 is such that 403 when fishing hook 401 is inserted into fishing weight 205, part of the shank 403 of fishing hook 401 is retained within fishing weight 205. This feature advantageously reduces the overall length of the fishing weight 205 and fishing hook 401, compared to fishing weight 205 and fishing hook 401 being assembled one after the other along the fishing line, and reduces the overall width of the fishing weight and the hook, compared to these components being placed separately, each to one side of the other.

Figure 5:
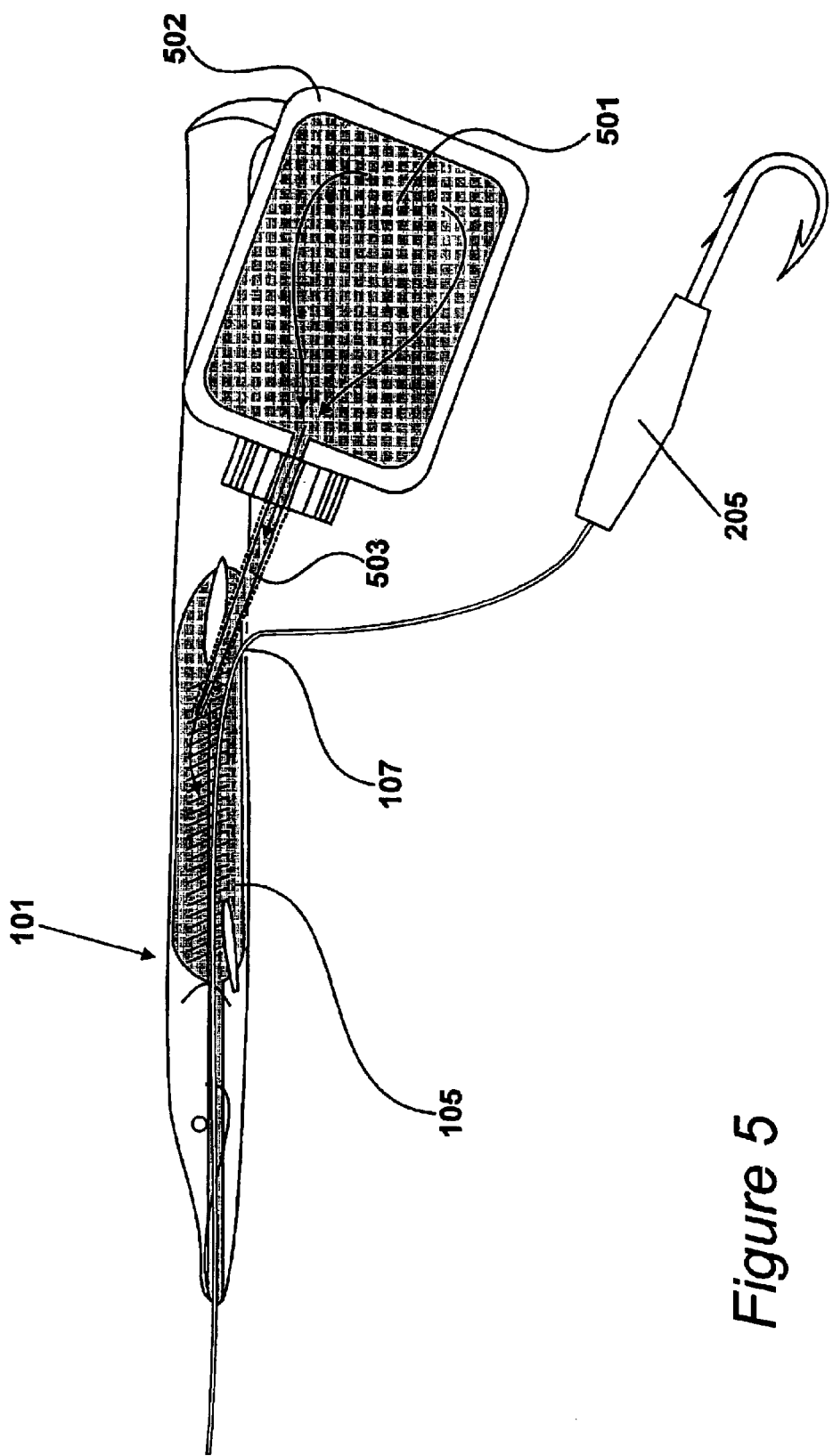
FIG. 5 shows the fishing lure shown in FIG. 2, being prepared to receive the weight and hook shown in FIG. 4.

Fishing lure 101 is configured to allow fishing weight 205, and in addition, fishing hook 401, to be removably inserted through second opening 107 of internal chamber 105 into fishing lure 101. FIG. 5 shows an amount of lubricant 501 being inserted into internal chamber 105, in preparation for fishing weight 205 being inserted into fishing lure 101. Lubricant 501 is contained within a receptacle 502, having an elongate tapered nozzle 503 to facilitate the lubrication of internal chamber 105 of fishing lure 101.

Figure 6:
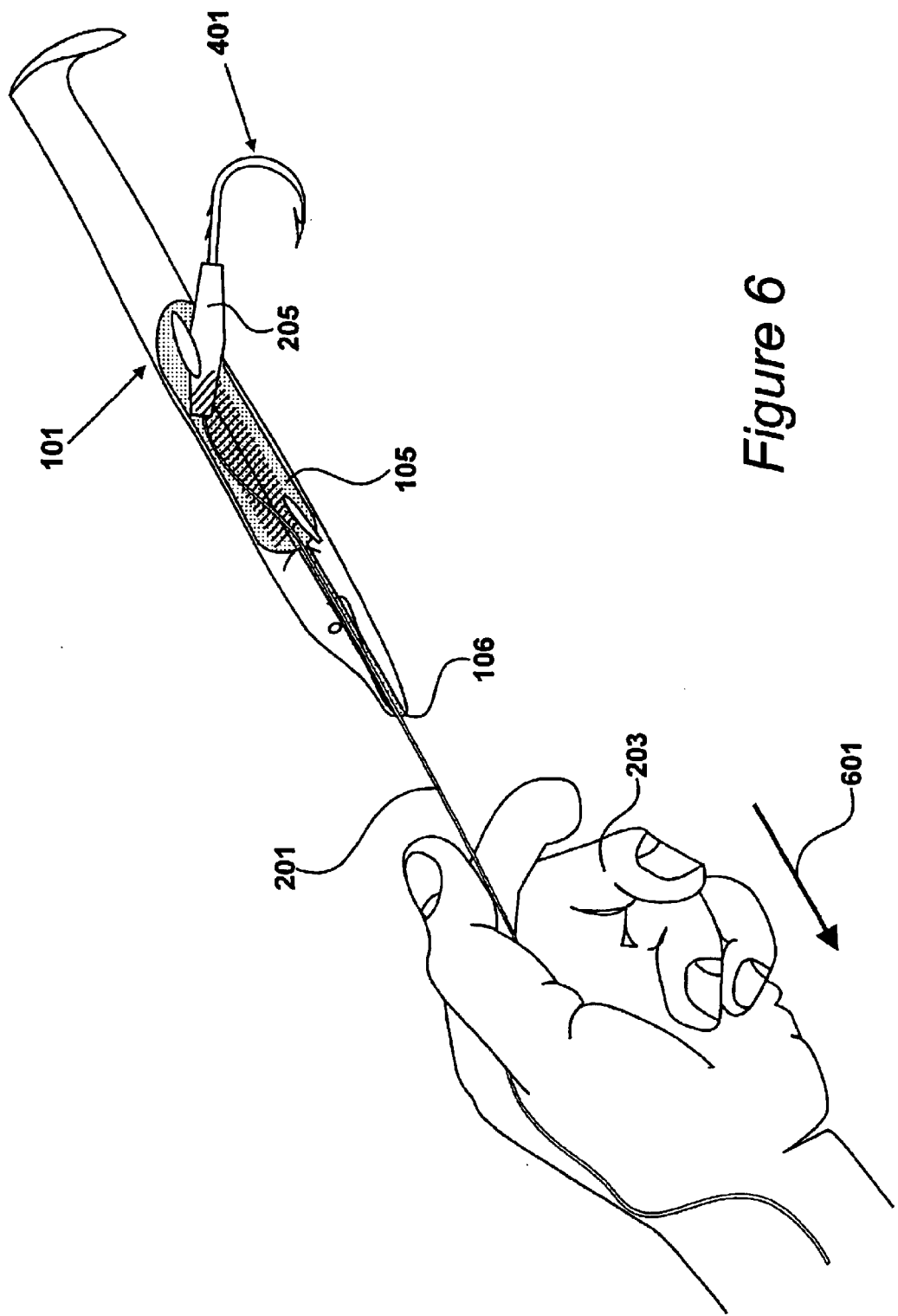
FIG. 6 shows the weight and hook, shown in FIGS. 4 and 5, being inserted into the fishing lure, shown in FIGS. 2 and 5.

FIG. 6 shows fishing weight 205 and fishing hook 401 being inserted into fishing lure 101. According to a method of assembling fishing lure 101, fishing weight 205 and fishing hook 401 onto fishing line 201, fishing hook 401 is inserted into fishing weight 205 prior to fishing weight 205 being inserted into internal chamber 105 of fishing lure 101. This step facilitates the insertion of fishing hook 401 into internal chamber 105, compared to inserting fishing hook 401 into fishing weight 205 after fishing weight 205 has been inserted into internal chamber 105 of fishing lure 101.

Hand 203 is shown in FIG. 6 pulling fishing line 201 through fishing lure 101 in the direction of arrow 601. This action reduces the amount of slack fishing line 201 within fishing lure 101, between fishing hook 401 and first opening 106 of internal chamber 105, and may also aid the process of inserting fishing weight 205 and fishing hook 401 into internal chamber 105, by exerting a pulling force upon fishing hook 401.

Figure 7:
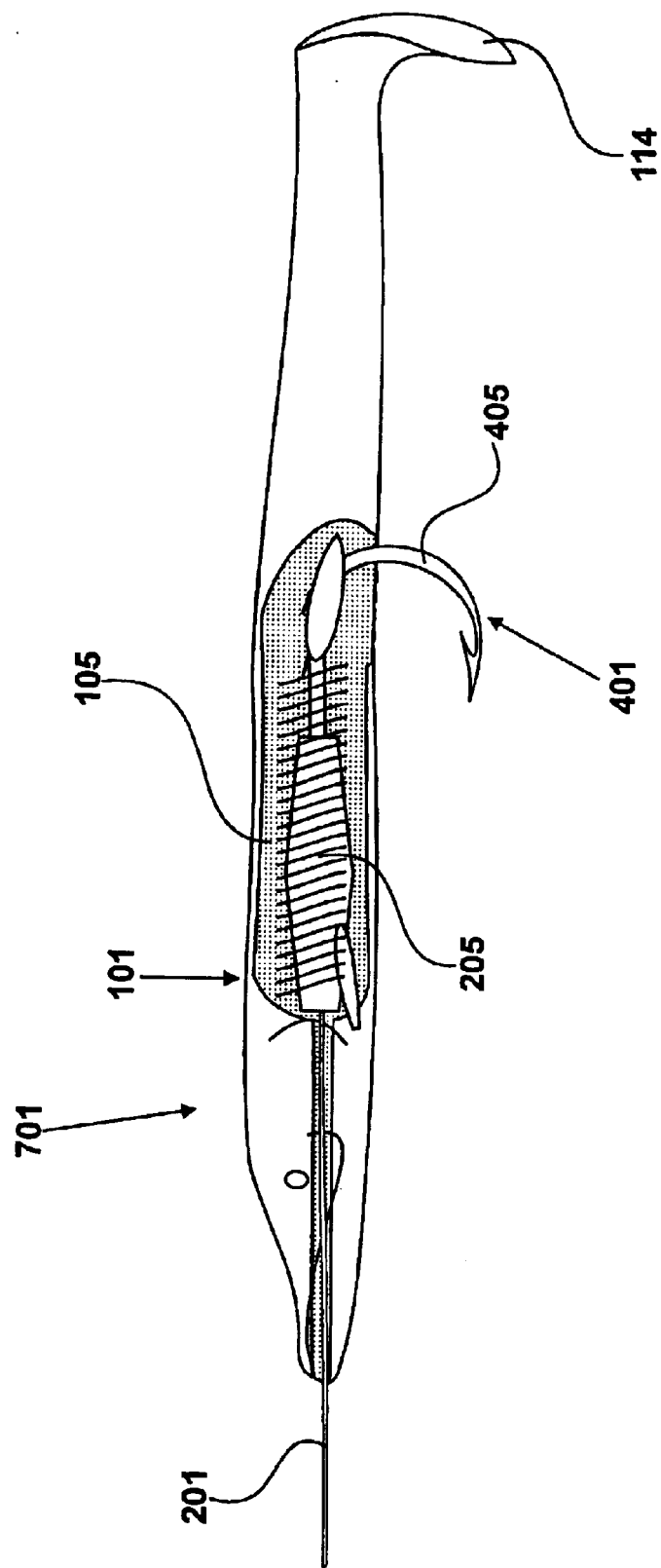
FIG. 7 shows a fishing lure assembly, comprising the weight and hook, shown in FIGS. 4 and 5, inserted into the fishing lure, shown in FIGS. 2 and 5; all assembled onto the fishing line.

FIG. 7 shows a fishing lure assembly 701. Fishing lure 101 is prepared for use, with fishing weight 205 and fishing hook 401 fully inserted and positioned within internal chamber 105; fishing lure 101, fishing weight 205 and fishing hook 401 assembled sequentially down-line onto fishing line 201. It can be seen from FIG. 7 that barbed crook 405 of fishing hook 401 is positioned on the underside of fishing lure 101.

As previously described, fishing hook 401 fits into the major axis section of rear portion 303, such that rotational movement of fishing hook 401 within fishing weight 205 is prevented. Fishing weight 205 fits tightly inside internal chamber 105, such that rotational movement of fishing weight 205 within fishing lure 101 is inhibited. In combination, these features inhibit movement of barbed crook 405 from the desired position, in this example from the underside of fishing lure 101. In addition, the rectangular configuration of second opening 106, the length thereof extending along the length of fishing lure 101, further inhibits such movement.

Figure 8:
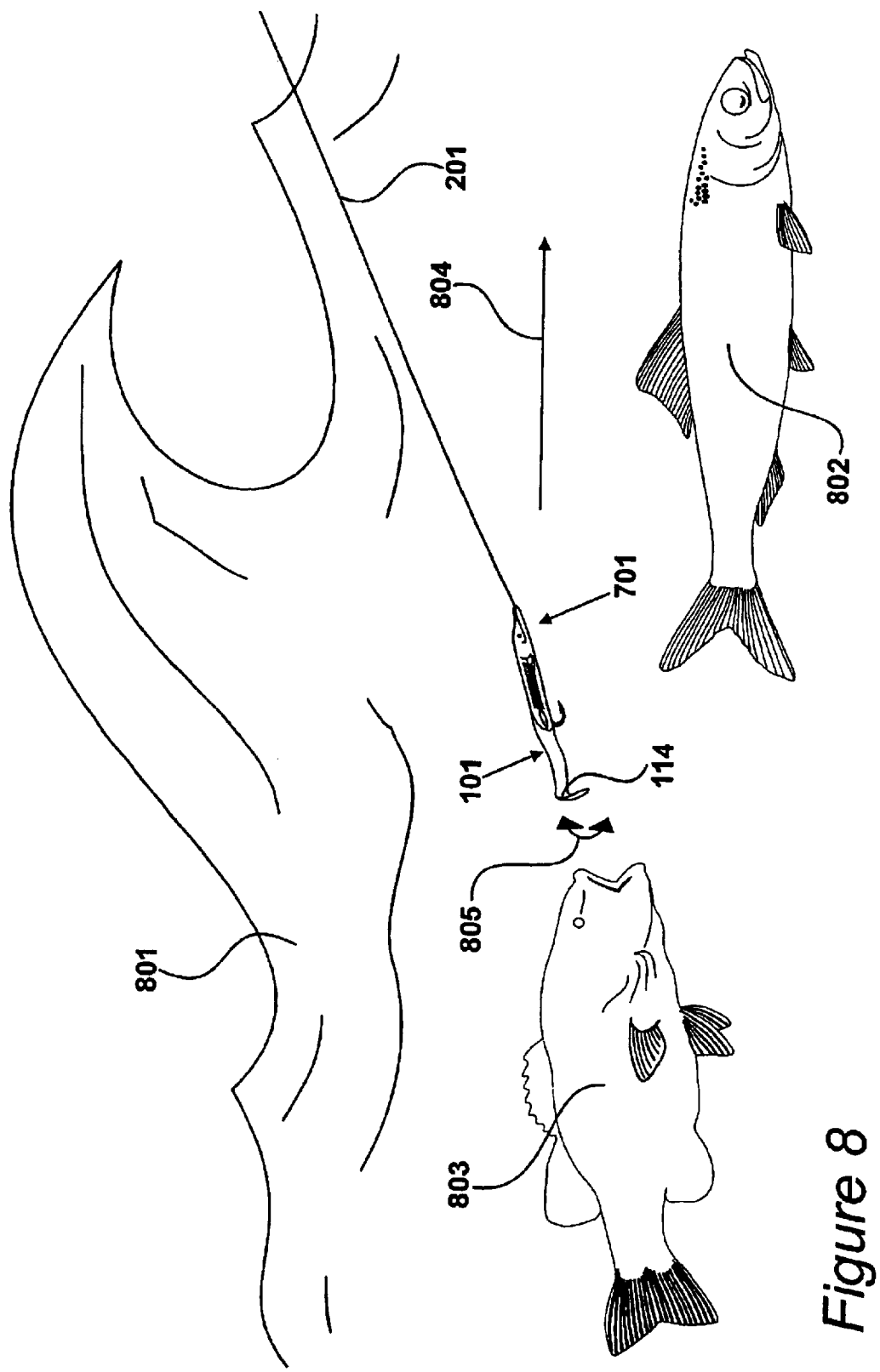
FIG. 8 is an underwater view of the fishing lure assembly shown in FIG. 7, in use.

Fishing lure assembly 701 is suitable for use within a fishing system comprising a fishing rod, such as fishing rod A04, to which is assembled a spinning reel, such as spinning reel A05. However, as shown in FIG. 8, fishing lure assembly 701 is suitable for use within a fishing system that does not comprise a float, such as bubble float A09, a swivel stop, such as swivel stop A13 or a lead line, such as lead line A15. This feature provides for a reduction in the cost of the fishing system and the amount of equipment that is normally transported by an angler. In addition, due to a reduction in the number of fishing system components which could become entangled with seaweed, or flotsam or jetsam, the risk of an angler having to sever fishing line 201 as a consequence is reduced.

FIG. 8 shows fishing lure 101 being used in tidal water 801 to attract fish 802 and 803. Fishing lure 101 has been cast out and is being reeled in by an angler. As previously described, within prior art fishing system A02, bubble float A09 acts as a weight on the end of fishing line A06 to facilitate casting out of prior art fishing lure A16. Within fishing lure assembly 701, fishing weight 205 acts as a weight on the end of fishing line 201 to facilitate casting out of fishing lure 101. In addition, fishing weight 205 also functions to balance fishing lure 101 whilst being dragged through tidal water 801; the weight provided by fishing weight 205 functioning to maintain fishing lure 101 within tidal water 801 and acting as a counterbalance to the effects of forces acting upon fishing lure 101.

As shown in FIG. 8, fishing line 201 is directly secured to fishing lure assembly 701, such that a pulling force exerted on fishing line 201, in the direction of arrow 804, will be transferred to fishing lure assembly 701. This feature confers greater control over fishing lure 101 to an angler, for example, greater control over the speed of fishing lure 101, moving in the direction of arrow 804, as fishing line 201 is reeled in by an angler.

Within the shown arrangement of fishing lure assembly 701, fishing line 201 is secured to connecting eye 402 of fishing hook 401. Connecting eye 402 is located within fishing weight 205, which is located in internal chamber 105 of fishing lure 101. With this arrangement, the pulling force exerted upon fishing line 201 as it is reeled in acts directly upon fishing hook 401. This feature confers to an angler greater control over the direction in which fishing lure 101 moves as the angler reels fishing line 201 in.

The aforementioned risk of rapid depth fluctuation, described in relation to the use of prior art fishing lure A16 in combination with bubble float A09, swivel stop A13 and lead line A15, is reduced by directly securing fishing line 201 to fishing assembly 701. This feature also functions to maintain fishing lure 101 at an effective depth, such as the depth of fish 802 and fish 803.

As described with reference to and as shown in FIGS. 3A and 3B, fishing weight 205 defines a passageway 301 therethrough about the central axis thereof, such that the weight provided by fishing weight 205 is distributed approximately uniformly about fishing line 201 when assembled within fishing lure assembly 701. Correspondingly, this feature functions to increase the uniformity with which fishing lure 101 moves as it is reeled in through tidal water 801.

Preferably, first opening 106 of internal chamber 105 of fishing lure 101 is a relatively small size, for example of a size allowing only a fishing line to be passed therethrough, in order to reduce the risk of water entering internal chamber 105, to reduce any drag effects, and to inhibit movement of fishing lure 101 about the point along fishing line 201 where fishing line 201 enters first opening 106 of internal chamber 105.

Fishing lure 101 is configured such that the movement of flexible tail portion 114 is uninhibited when fishing lure 101 is assembled into fishing lure assembly 701. Flexible tail portion 114 is configured to maintain fishing lure 101 in the upright position whilst being reeled in through tidal water 801, and is further configured such that as fishing lure 101 moves through tidal water 801, in the direction of arrow 804, flexible tail portion 114 oscillates side to side in the directions indicated by double headed arrow 805. The realistic motion achieved by fishing lure 101 within fishing lure assembly 701, increases the attractiveness of fishing lure 101 to fish, such as fish 803.

In the event that fish 803 attempts to feed upon fishing lure 101 and becomes caught upon fishing hook 401, according to the configuration of fishing lure assembly 701, fishing lure 101 is able to travel up-line along fishing line 201. This action may occur as a result of the action of fish 803 whilst becoming caught upon fishing hook 401, or an angler may move fishing lure 101 along the line, if required. This feature reduces the degree of interference of fishing lure 101 during the process of an angler removing fishing hook 401 from successfully caught fish 803. Fishing weight 205 may be taken along with fishing lure 101, or fishing lure 101 and fishing weight 205 may become separated from one another as fishing lure 101 travels along the fishing line. In addition, the risk of damage to fishing lure 101 is reduced, thus providing for an increase in the working life of fishing lure 101, which may be re-used.

Figure 9:
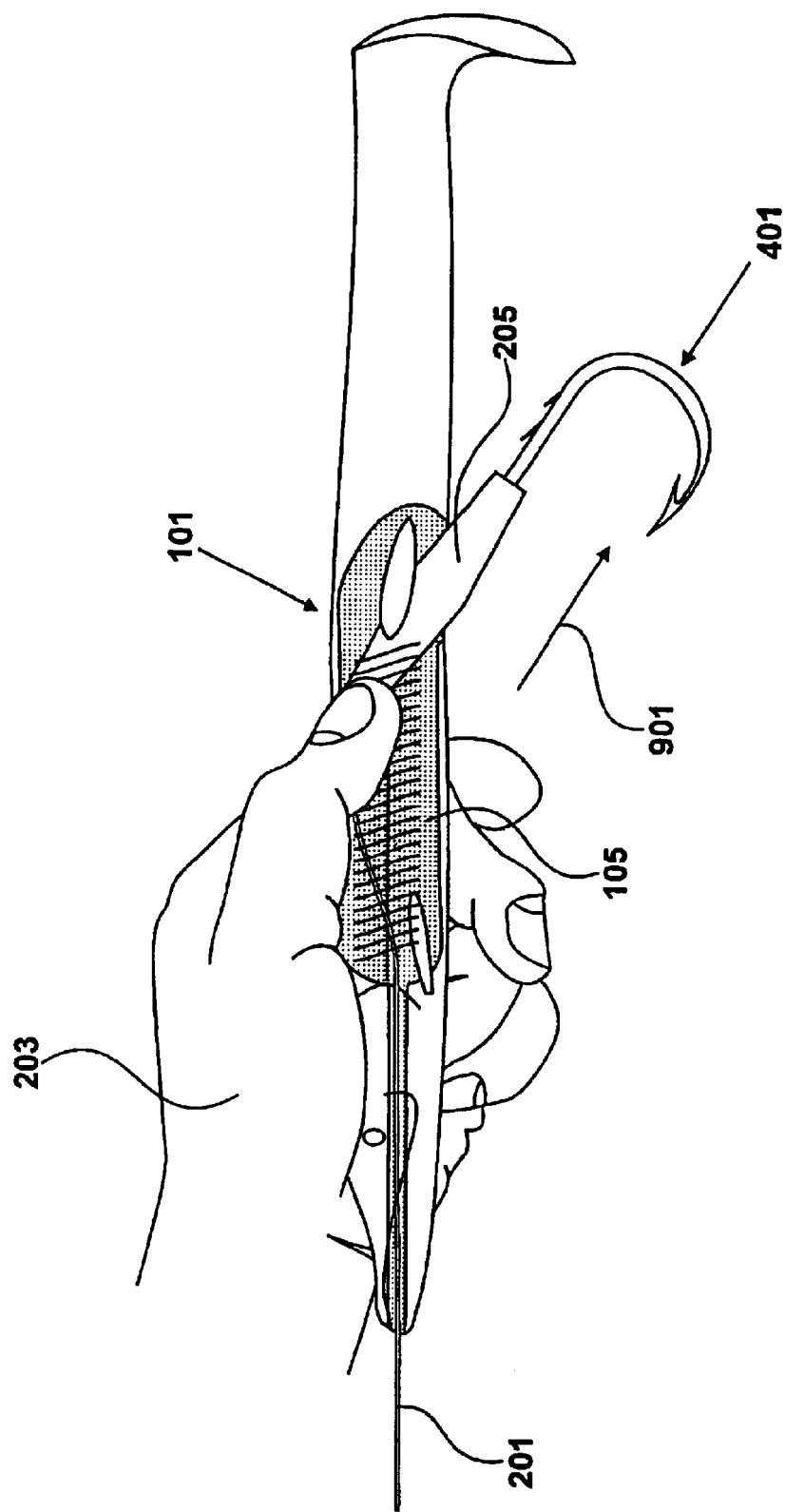
FIG. 9 shows the weight and hook, shown in FIGS. 4 and 5 assembled onto a fishing line, being removed from the fishing lure, shown in FIGS. 2 and 5 assembled onto the fishing line.

Fishing lure assembly 701 is configured to be separated into the fishing lure 101, fishing line 201, fishing weight 205 and fishing hook 401 components. FIG. 9 illustrates a method of removing fishing weight 205 and fishing hook 405 from within internal chamber 105 of fishing lure 101; wherein fishing weight 205, with fishing hook 401 remaining inserted inside, is manipulated by hand 203 until both fishing weight 205 and fishing hook 401 are tilted towards second opening 107 of internal chamber 105. Fishing weight 205, shown held by hand 203, is then squeezed out from internal chamber 105, in the direction of arrow 901. To assist the removal of fishing weight 205 from fishing lure 101, an amount of lubricant 501 may be inserted into internal chamber 105 prior to or during the manipulation of fishing weight 205. It can be observed from FIG. 9 that as fishing weight 205 is tilted towards second opening 107 of internal chamber 105, fishing line 201 is drawn into internal chamber 105. In addition, FIG. 9 shows hand 203 positioned on the upper side of fishing lure 101, away from first opening 106 of internal chamber 105, such that the movement of fishing line 201 through fishing lure 101 is uninhibited.

Fishing lure 101 is configured such that fishing weight 205 is removable, to allow an angler to use a variety of fishing weights, having different weights, in combination with fishing lure 101. Similarly, fishing assembly 701 is configured such that an angler may use a variety of fishing hooks, having different dimensions or style or number of barbs, in combination with fishing lure 101. Thus, an angler may select a fishing weight from a plurality of fishing weights suitable for use in combination with fishing lure 101 and a fishing hook from a plurality of fishing weights suitable for use in combination with fishing lure 101, according to the fishing conditions.

Figure 10:
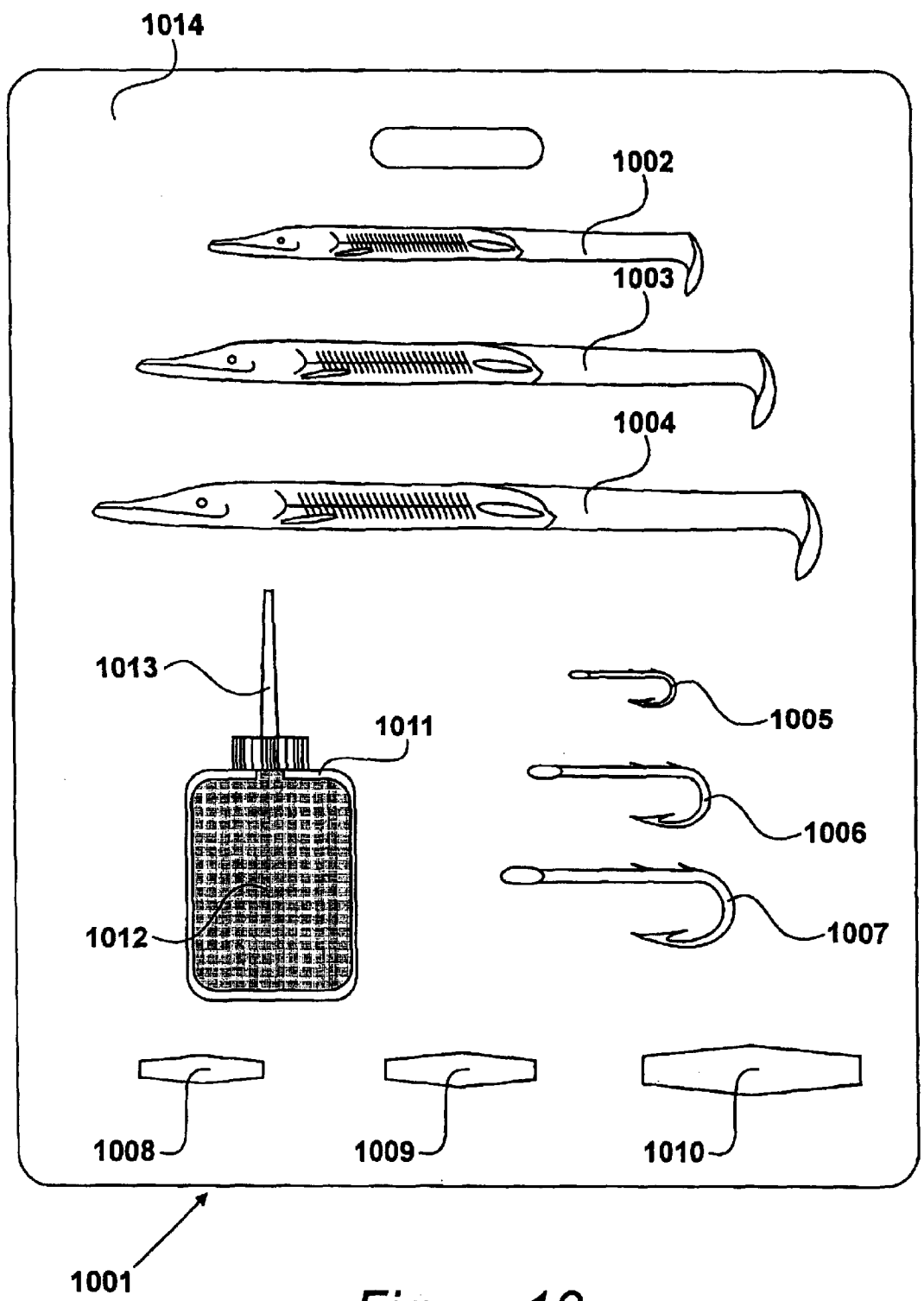
FIG. 10 shows a retail unit comprising a plurality of fishing lures, a plurality of weights, a plurality of hooks, and a receptacle containing lubricant, all grouped by packaging.

FIG. 10 shows a retail pack 1001. Retail pack 1001 comprises three fishing lures 1002, 1003 and 1004, fishing lure 1002 having smaller dimensions than fishing lure 1003, which has smaller dimensions than fishing lure 1004. Each fishing lure 1002, 1003, 1004 incorporates an internal chamber and first and second openings arranged in substantially the same arrangement as previously described with respect to fishing lure 101. Retail pack 1001 further comprises three fishing hooks 1005, 1006 and 1007; fishing hook 1005 having smaller dimensions than fishing hook 1006, which has smaller dimensions than fishing hook 1007. Fishing hooks 1005, 1006, 1007 are similar to previously described fishing hook 401. Retail pack 1001 also comprises three fishing weights, 1008, 1009, 1010 fishing weight 1008 having smaller dimensions than fishing weight 1009, which has smaller dimensions than fishing weight 1010. Fishing weights 1008, 1009, 1010 are similar to previously described fishing weight 205. In addition, retail pack 1001 comprises a receptacle 1011 containing lubricant 1012. Receptacle 1011 is similar to previously described receptacle 502, and has an elongate nozzle 1013. The components of retail pack 1001 are grouped together by packaging 1014 for the convenience of both retailer and purchaser.

The configuration of fishing lure 101 is such that fishing lure 101, fishing weight 205 and fishing hook 401 can be assembled into fishing lure assembly 701 quickly and easily. Correspondingly, fishing weight 205 and fishing hook 401 can be changed by an angler quickly and easily. An angler may therefore conveniently take retail pack 1001 on an angling expedition, and may select a heavier weight, such as fishing weight 1010, for use in combination with fishing lure 101 in spring tide conditions; or a lighter weight, such as fishing weight 1008, for use in combination with fishing lure 101 in neap tide conditions.

Fishing lure 101 is preferably fabricated from a flexible material, for example rubber. A flexible material is advantageous in assisting the manipulation of fishing lure 101 during the processes of inserting fishing weight 205 and fishing hook 401 into internal chamber 105 of fishing lure 101, and removing fishing weight 205 and fishing hook 401 from internal chamber 105 of fishing lure 101. In addition, a durable, flexible material provides for an increase in the working life of fishing lure 101 which is configured to be assembled into and separated from fishing lure assembly 701 a plurality of times.

Furthermore, many types of flexible material are available, for example, having different densities, colours, degrees of transparency or different effects, such as gloss or sparkly. Preferably, fishing lure 101 has a degree of transparency, such that internal chamber 105 is visible, to facilitate a user of fishing lure 101 in the process of assembling fishing lure 101 into fishing lure assembly 701, and similarly to facilitate the process of separating fishing lure assembly 701 into the separate components.

The embodiment described herein offers several advantages over the discussed prior art. However, the skilled reader will understand that substitutions may be made for the components of fishing lure assembly 701 without departing from the spirit of the invention, although some substitutions could result in the loss of one or more of the advantages. In particular, different types of weights and hooks could be used, including those which do not interact to prevent movement of the hook as herein described. A fishing lure that is suitable for use in a different type of water, for example freshwater lake, could be used. In addition, a fishing lure that is not a facsimile of any type of fish could be used.

What is claimed:

1. A fishing lure assembly, comprising:
   a fishing lure defining an internal chamber having a first opening and a second opening;
   a hook having a connecting eye and a crook;
   a weight defining a passageway longitudinally therethrough, the passageway configured to receive fishing line and the connecting eye;
   the weight being disposed within the internal chamber of the fishing lure, and with the fishing line extending through the first opening into the passageway of the weight;
   the connecting eye, with the fishing line secured thereto, being disposed within the passageway of the weight; and
   the crook extending outwardly through the second opening.

2. A fishing lure assembly as claimed in claim 1, wherein the weight includes a central longitudinal axis, and a portion of the passageway is radial about the central longitudinal axis.

3. A fishing lure assembly as claimed in claim 1, wherein the weight includes a central longitudinal axis, and the passageway includes a front portion, a rear portion, and a face defined between the front and rear portions substantially perpendicular to the central longitudinal axis.

4. A fishing lure assembly as claimed in claim 1, wherein a portion of the passageway is shaped to inhibit rotational movement of the connecting eye within the weight.

5. A fishing lure assembly as claimed in claim 1, wherein the weight fits tightly inside the internal chamber of the fishing lure such that rotational movement of the weight within the fishing lure is inhibited.

6. A fishing lure assembly as claimed in claim 1, wherein the second opening of the fishing lure is configured to inhibit movement of the crook.

7. A fishing lure assembly as claimed in claim 1, wherein the second opening of the fishing lure is configured to allow the weight to be removably inserted into the internal chamber.

8. A fishing lure assembly as claimed in claim 1, wherein the fishing lure is a facsimile fish.

9. A fishing lure assembly as claimed in claim 8, wherein the fishing lure is a sand eel.

10. A fishing lure assembly as claimed in claim 1, wherein the fishing lure is fabricated from a flexible material.

11. A fishing lure assembly as claimed in claim 10, wherein the flexible material is rubber.

12. A fishing lure assembly as claimed in claim 1, wherein the fishing lure is translucent.

13. A fishing lure assembly as claimed in claim 1, wherein the hook comprises a plurality of barbs.

14. A fishing lure assembly as claimed in claim 1, wherein the fishing lure includes a head portion defining the first opening, and a body portion defining the second opening.

15. A fishing lure assembly as claimed in claim 1, wherein the weight defines an internal shoulder within the passageway against which the connecting eye abuts.

* * * * *